US010963647B2

(12) United States Patent
Indenbom et al.

(10) Patent No.: US 10,963,647 B2
(45) Date of Patent: *Mar. 30, 2021

(54) PREDICTING PROBABILITY OF OCCURRENCE OF A STRING USING SEQUENCE OF VECTORS

(71) Applicant: ABBYY Production LLC, Moscow (RU)

(72) Inventors: Evgenii Mikhaylovich Indenbom, Moscow (RU); Daniil Garryevich Anastasiev, Moscow (RU)

(73) Assignee: ABBYY Production LLC, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,245

(22) Filed: May 18, 2020

(65) Prior Publication Data
US 2020/0279079 A1 Sep. 3, 2020

Related U.S. Application Data

(63) Continuation of application No. 16/021,689, filed on Jun. 28, 2018, now Pat. No. 10,657,203.

(30) Foreign Application Priority Data

Jun. 27, 2018 (RU) ................................ 2018123353

(51) Int. Cl.
| G06F 40/30 | (2020.01) |
| G06N 3/08 | (2006.01) |
| G06N 3/04 | (2006.01) |
| G06F 40/242 | (2020.01) |
| G06F 40/253 | (2020.01) |

(52) U.S. Cl.
CPC ............ *G06F 40/30* (2020.01); *G06F 40/242* (2020.01); *G06F 40/253* (2020.01); *G06N 3/0472* (2013.01); *G06N 3/08* (2013.01)

(58) Field of Classification Search
CPC ...... G06F 40/30; G06F 40/242; G06F 40/253; G06N 3/08; G06N 3/0472
USPC ........................................................... 704/9
See application file for complete search history.

(56) References Cited

U.S. PATENT DOCUMENTS

| 6,272,456 B1 * | 8/2001 | de Campos ........... G06F 40/263 704/8 |
| 9,037,464 B1 * | 5/2015 | Mikolov ............... G06F 40/279 704/255 |
| 9,594,741 B1 * | 3/2017 | Thakurta ................. G06F 17/16 |
| 9,639,521 B2 | 5/2017 | Seow et al. |

(Continued)

OTHER PUBLICATIONS

Jerome R Belegarda et al., "State of the art in statistical methods for language and speech processing", Computer Speech and Language 35 (2016) 163-184 (22 pages).

(Continued)

*Primary Examiner* — Edwin S Leland, III
(74) *Attorney, Agent, or Firm* — Lowenstein Sandler LLP

(57) ABSTRACT

Systems and methods are disclosed to predict probability of occurrence of a string. A sequence of vectors is generated based at least on a maximum length of word for each symbol in the string. The sequence of vectors is provided to a machine learning unit for the string. A probability of occurrence of the string is obtained from the machine learning unit.

20 Claims, 5 Drawing Sheets

(56) References Cited

U.S. PATENT DOCUMENTS

| | | | |
|---|---|---|---|
| 10,091,354 B1* | 10/2018 | Boehme | H04M 3/42391 |
| 2002/0022956 A1* | 2/2002 | Ukrainczyk | G06F 16/353 |
| | | | 704/9 |
| 2004/0064317 A1* | 4/2004 | Othmer | G10L 15/30 |
| | | | 704/260 |
| 2005/0154580 A1* | 7/2005 | Horowitz | G06F 40/211 |
| | | | 704/9 |
| 2007/0067157 A1* | 3/2007 | Kaku | G06F 40/289 |
| | | | 704/10 |
| 2007/0136256 A1* | 6/2007 | Kapur | G06F 16/367 |
| 2015/0046155 A1* | 2/2015 | Seow | G06F 40/30 |
| | | | 704/10 |
| 2015/0051896 A1* | 2/2015 | Simard | G06F 40/58 |
| | | | 704/2 |
| 2017/0293608 A1* | 10/2017 | Seow | G06F 40/242 |
| 2018/0067918 A1* | 3/2018 | Bellegarda | G06F 40/263 |
| 2018/0210874 A1* | 7/2018 | Fuxman | G06F 40/35 |
| 2019/0042544 A1* | 2/2019 | Kashyap | G06F 7/483 |
| 2019/0138887 A1* | 5/2019 | Salem | G06F 40/216 |
| 2020/0004819 A1* | 1/2020 | Indenbom | G06F 40/253 |

OTHER PUBLICATIONS

Johg-Hoon Oh et al., "Japanese Term Extraction Using Dictionary Hierarchy and Machine Translation system", Computer Science Dept., Korea Terminolog Research Center for Language and Knowledge Engineering (KORTERM), Korea Advanced Institute of Science & Technology (KAIST), Kusong-Dong, Yusong-Gu Taejon, 305-701 Republic of Korea, no date shown (28 pages).

USPTO, Office Action for U.S. Appl. No. 16/021,689, dated Jul. 11, 2019.

USPTO, Notice of Allowance for U.S. Appl. No. 16/021,689, dated Jan. 9, 2020.

* cited by examiner

US 10,963,647 B2

PREDICTING PROBABILITY OF OCCURRENCE OF A STRING USING SEQUENCE OF VECTORS

RELATED APPLICATIONS

The present application is a Continuation of U.S. patent application Ser. No. 16/021,689, filed Jun. 28, 2018 and claims priority to Russian Patent Application No.: RU2018123353, filed Jun. 27, 2018, the entire contents of which are hereby incorporated by reference herein.

TECHNICAL FIELD

The present disclosure is generally related to computer systems, and is more specifically related to systems and methods for predicting probability of occurrence of a string using a language model.

BACKGROUND

A language model may be used to predict the probability distribution of a given linguistic units, such as, symbols, words, sentences, etc. For example, a probabilistic language model can predict the next word in a sequence of words given the words that precede it. A language model can assign the probability for the likelihood of a given word or symbol to follow a sequence of words or symbols. A language model can learn the probability based on examples of text, speech, etc.

SUMMARY OF THE DISCLOSURE

In accordance with one or more aspects of the present disclosure, an example method may comprise: receiving a plurality of strings, each string of the plurality of strings comprising a plurality of symbols; for each string of the plurality of strings, generating, by a processing device, a first sequence of vectors based at least on a maximum length of word for each symbol in the string; providing to a machine learning unit the first sequence of vectors for each string of the plurality of strings; and obtaining from the machine learning unit a probability of occurrence of each string of the plurality of strings.

In accordance with one or more aspects of the present disclosure, an example system may comprise: a memory device storing instructions; a processing device coupled to the memory device, the processing device to execute the instructions to: receive a plurality of strings, each string of the plurality of strings comprising a plurality of symbols; for each string of the plurality of strings, generate a first sequence of vectors based at least on a maximum length of word for each symbol in the string; provide to a machine learning unit the first sequence of vectors for each string of the plurality of strings; and obtain from the machine learning unit a probability of occurrence of each string of the plurality of strings.

In accordance with one or more aspects of the present disclosure, an example non-transitory computer-readable storage medium may comprise instructions that, when executed by a processing device, cause the processing device to: receive a plurality of strings, each string of the plurality of strings comprising a plurality of symbols; for each string of the plurality of strings, generate a first sequence of vectors based at least on a maximum length of word for each symbol in the string; provide to a machine learning unit the first sequence of vectors for each string of the plurality of strings; and obtain from the machine learning unit a probability of occurrence of each string of the plurality of strings.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
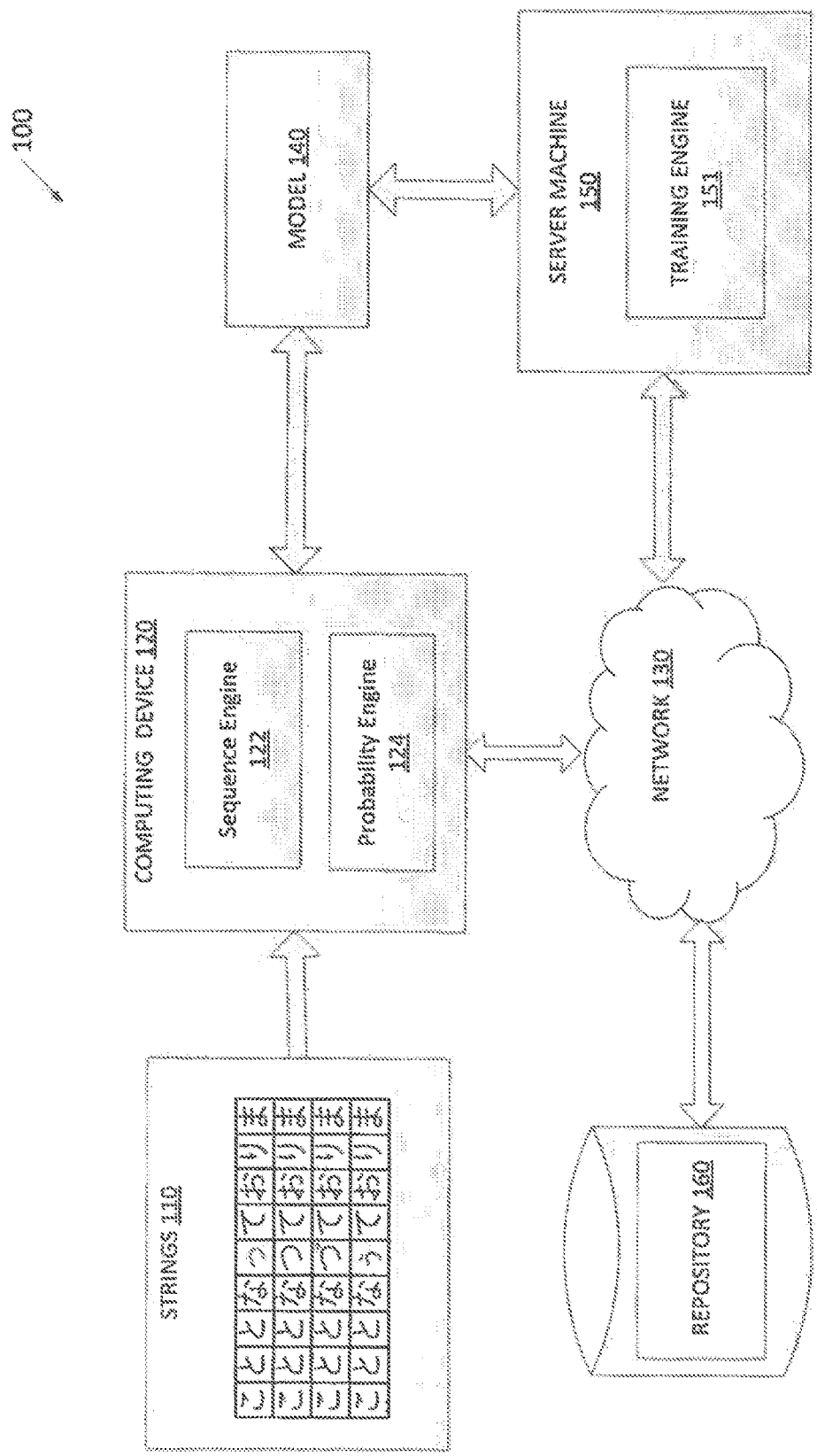
FIG. 1 depicts a high-level component diagram of an illustrative system architecture, in accordance with one or more aspects of the present disclosure.

A language model may be used to predict the probability distribution of a given linguistic units, such as, symbols, words, sentences, etc. Language modeling is used for various natural language processing tasks, such as, machine translation, speech recognition, optical character recognition, spelling check, handwriting recognition, etc. The use of neural networks in language modeling may be known as neural language modeling or neural net language modeling. Neural language models may use continuous representations or word embeddings to predict the probability of occurrence of a particular language unit, such as, a symbol, word, sentence, etc. Word embeddings are used to represent words or phrases from natural language vocabulary by mapping the words or phrases to vectors of real numbers. Neural network language models may be constructed and trained as probabilistic classifiers that learn to predict a probability distribution. A probabilistic classifier may be a machine learning classifier that can predict a probability distribution over a set of classes given an observation of an input, rather than only outputting the most likely class that the observation should belong to.

Conventionally, a neural network used in a neural language model can be trained to predict a probability distribution over the linguistic unit given some linguistic context. A linguistic context may be defined in terms of what follows or what precedes a particular linguistic unit. For example, a context may be a fixed-sized window of previous words. In another example, a context may be a fixed-size window of future words. For example, the fixed-size window may consist of four words. In some cases, each word may contain a specified number of letters, such as five letters, for example. In an example, the fixed-size window may consist of one word. In that case, the context may be the word that immediately precedes or follows the target word or symbol.

Traditionally, language modeling may involve analyzing a particular linguistic unit (e.g., the target word or symbol) by taking into account a context that precedes a word or symbol, and/or the context that follows a word or symbol to predict the probability of occurrence of the particular linguistic unit or a portion of it. In an example using both previous and future context, the probability value may be expressed as:

$$P(U_t|C_P,C_f),$$

where P is the probability of occurrence of $U_t$ given the context $C_P$ and $C_f$, $U_t$ is the target unit (e.g., symbol, string, word, etc.), $C_P$ is the preceding context, $C_f$ is the following context.

The systems and methods described herein represent significant improvements in better predicting probability of occurrence of a linguistic unit (e.g., a string, a word) by not only using the previous and/or future context, but also using maximum lengths of a word that begins with each symbol in the linguistic unit (e.g., a string, a word). The mechanisms provided herein can train a machine learning model (e.g., a neural network) to predict, given a plurality of strings, the probability of occurrence of each string of the plurality of strings. The mechanism may include receiving a plurality of strings for which probabilities of occurrence values are to be predicted. The plurality of strings may each contain plurality of symbols. The symbols may follow one another to form each string. The plurality of strings may vary from each other by one symbol. The one symbol may be located on the same position of each string. The strings may be sent to a machine learning unit to predict the probability of occurrence of each string. Prior to sending the strings to the machine learning unit, each string may be represented as a sequence of vectors.

In some implementations, the mechanisms may generate a sequence of vectors comprising one or more vectors. Each vector in the sequence of vectors may correspond to each symbol in a given string. Each vector in the sequence of vectors may be derived by joining together a first vector and a second vector for a given symbol in the string. The first vector may comprise a maximum length of word for a given symbol in a given string. The maximum length may correspond to the length of the longest possible word (e.g., a word that can be found in a dictionary) within the string that begins with the given symbol. The second vector may comprise a symbol vector for the given symbol in the given string. The symbol vector may be formed based on one or more of: symbol embeddings, unified vector for symbols of an alphabet different from the alphabet used in the string, vectors for frequently occurring punctuation marks, a vector for rare punctuation marks, vectors for numerals, etc. The first and second vectors for each symbol may be combined together into one vector for each symbol.

After generating the sequence of vectors, the mechanisms may provide the sequence of vectors to a machine learning unit as an input. In some implementations, the machine learning unit may comprise fully connected neural networks with multiple layers. The neural network may receive each sequence of vectors for each string and apply sequence of matrix transformations. In an implementation, the machine learning unit may comprise two fully connected layers and a fully connected output layer. Batch normalization and rectifier linear unit (ReLU) functions may be applied to the outputs of the initial two fully connected layers and a sigmoid activation function may be applied on the output of the output layer. The machine learning unit may provide as an output a probability of occurrence of each string of the plurality of strings. The probability value may be expressed using a vector, where each vector component corresponds to one string. The value of the component of the vector that is closest to the value 'one' compared to the values of the other components corresponds to the string having the highest probability of occurrence. Thus, if the plurality of strings reflects different possibilities of a word to be recognized, the string that produces the highest probability value may be the string that represents the most likely possibility of word recognition.

The terms "character," "symbol," "letter," and "cluster" may be used interchangeably herein. A cluster may refer to an elementary indivisible graphic element (e.g., graphemes and ligatures), which are united by a common logical value. Further, the term "word" may refer to a sequence of symbols, and the term "sentence" may refer to a sequence of words.

The neural language model may be used in various stages of natural language processing (NLP), such as post-processing of the recognized text, spell-checking, text recognition, text generation, translation, etc. The method is easily applied to multiple use cases. The techniques described herein allow for improved accuracy of prediction of probabilities of occurrence in language modeling. Using the maximum length of words produces improved predictions of probabilities because of the use of words with commonplace meaning, such as, words found in a dictionary. A dictionary contains a comprehensive repository of words with actual meanings, while a neural network with relatively small dataset may not be trained to remember each of those words. Thus, cross referencing the words with dictionary words and using the maximum length of the words found in a dictionary provide for a simple network topology, and the network can be quickly trained on a relatively small dataset.

Various aspects of the above referenced methods and systems are described in details herein below by way of examples, rather than by way of limitation.

FIG. 1 depicts a high-level component diagram of an illustrative system architecture 100, in accordance with one or more aspects of the present disclosure. System architecture 100 includes a computing device 120, a repository 160, and a server machine 150 connected to a network 130. Network 130 may be a public network (e.g., the Internet), a private network (e.g., a local area network (LAN) or wide area network (WAN)), or a combination thereof.

The computing device 120 may perform prediction of probability of occurrence using artificial intelligence. In one embodiment, computing device 120 may be a desktop computer, a laptop computer, a smartphone, a tablet computer, a server, a scanner, or any suitable computing device capable of performing the techniques described herein. Computing device 120 may receive a plurality of strings. In an example, strings 110 may be received by the computing device 120. In some implementations, strings 110 may be produced by an alpha-numeric input device, a voice device, or another device capable of producing a plurality of strings. Each string in strings 110 may comprise a plurality of symbols. In an example, a particular word on an image of a document may need to be recognized. A text recognition system may produce a set of strings as potential candidates for the word to be recognized. To make an ultimate decision on which one of these potential candidates should be selected as a result of word recognition, the set of strings may be provided as strings 110 as an input to computing device 120. Computing device 120 may predict a probability of occurrence of each of the strings 110 and produce the probability as an output. The string with the highest probability of occurrence out of the strings 110 may be selected as the result of word recognition from the set of potential candidate strings.

In one embodiment, computing device 120 may include a sequence engine 122 and a probability engine 124. The sequence engine 122 and the probability engine 124 may each include instructions stored on one or more tangible, machine-readable storage media of the computing device 120 and executable by one or more processing devices of the computing device 120. In one embodiment, sequence engine 122 may generate a sequence of vectors based on strings 110. For example, each vector in the sequence of vectors may be derived by combining a symbol vector for a given symbol in a given string of strings 110 and a vector of maximum length of word for a given symbol in a given string of strings 110.

In one embodiment, probability engine 124 may use a trained machine learning model 140 that is trained and used to predict probability of occurrence of each of strings 110 given the sequence of vectors for strings 110 generated by sequence engine 122. The machine learning model 140 may be trained using training set of strings and corresponding sequence vectors. In some instances, the machine learning model 140 may be part of the probability engine 124 or may be accessed on another machine (e.g., server machine 150) by the probability engine 124. Based on the output of the trained machine learning model 140, the probability engine 124 may predict the probability of occurrence of each string of strings 110.

Server machine 150 may be a rackmount server, a router computer, a personal computer, a portable digital assistant, a mobile phone, a laptop computer, a tablet computer, a camera, a video camera, a netbook, a desktop computer, a media center, or any combination of the above. The server machine 150 may include a training engine 151. The machine learning model 140 may refer to model artifacts that are created by the training engine 151 using the training data that includes training inputs and corresponding target outputs (correct answers for respective training inputs). During training, patterns in the training data that map the training input to the target output (the answer to be predicted) can be found, and are subsequently used by the machine learning model 140 for future predictions. As described in more detail below, the machine learning model 140 may be composed of, e.g., a single level of linear or non-linear operations (e.g., a support vector machine [SVM]) or may be a deep network, i.e., a machine learning model that is composed of multiple levels of non-linear operations). Examples of deep networks are neural networks including convolutional neural networks, recurrent neural networks with one or more hidden layers, and fully connected neural networks.

As noted above, the machine learning model 140 may be trained to determine the probability of occurrence for plurality of strings using training data, as further described below. Once the machine learning model 140 is trained, the machine learning model 140 can be provided to probability engine 124 for analysis of strings 110. For example, the probability engine 124 may input the sequence of vectors for strings 110 being analyzed into the machine learning model 140. In some examples, model 140 may consist of a fully connected neural network with multiple layers. For example, the neural network may comprise of two fully connected layers of the network and a fully connected output layer of the network. The probability engine 124 may obtain one or more outputs from the trained machine learning model 140. The output may be a sequence of probability values indicating probabilities of occurrences of each string of the strings 110.

The repository 160 may be a persistent storage that is capable of storing strings 110 as well as data structures to tag, organize, and index the strings 110. Repository 160 may be hosted by one or more storage devices, such as main memory, magnetic or optical storage based disks, tapes or hard drives, NAS, SAN, and so forth. Although depicted as separate from the computing device 120, in an implementation, the repository 160 may be part of the computing device 120. In some implementations, repository 160 may be a network-attached file server, while in other embodiments, repository 160 may be some other type of persistent storage such as an object-oriented database, a relational database, and so forth, that may be hosted by a server machine or one or more different machines coupled to the via the network 130.

Figure 2:
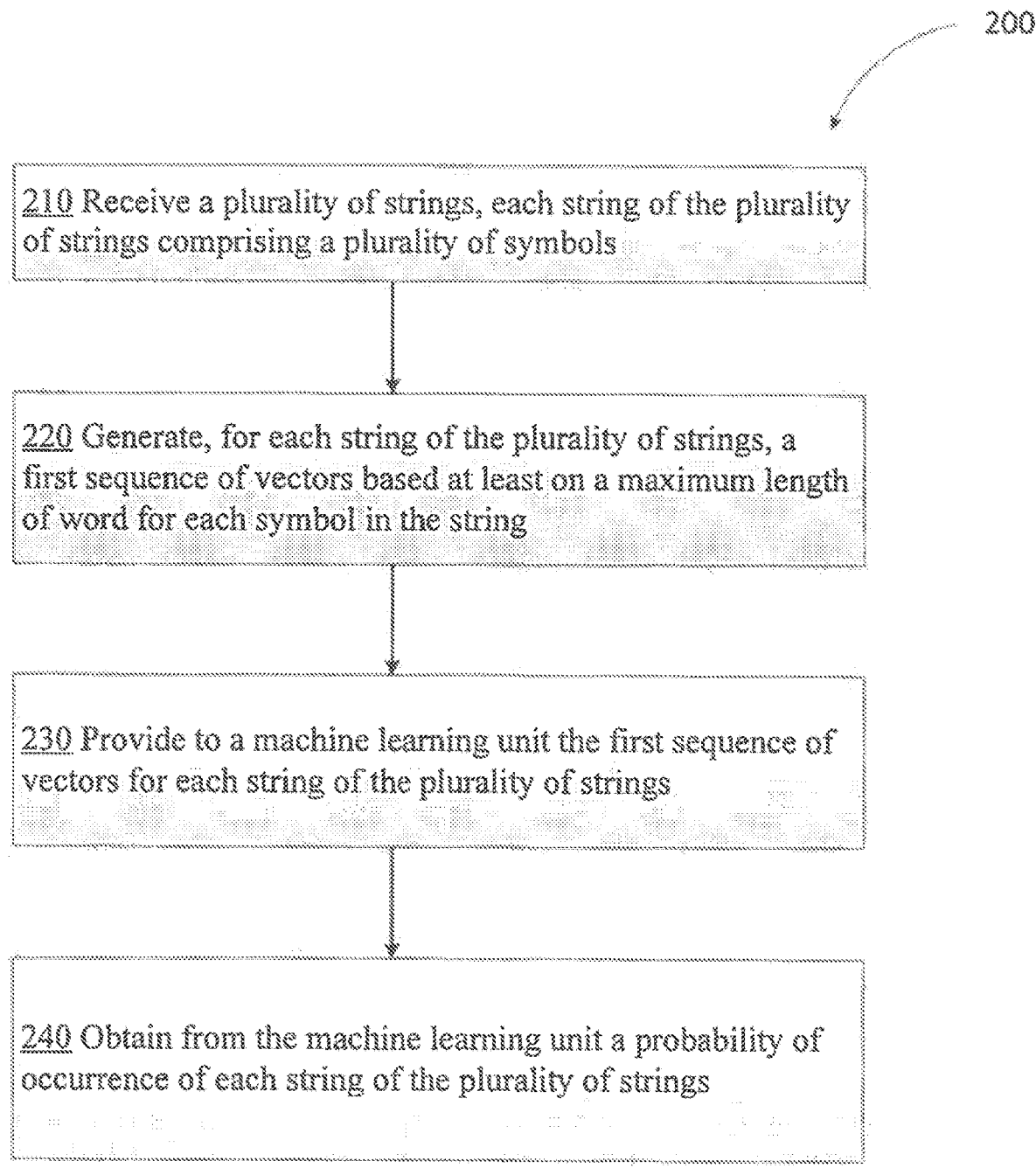
FIG. 2 depicts a flow diagram of one illustrative example of a method for predicting probability of occurrence of a string, in accordance with one or more aspects of the present disclosure.

FIG. 2 depicts a flow diagram of one illustrative example of a method for predicting probability of occurrence of a string, in accordance with one or more aspects of the present disclosure. Method 200 and/or each of its individual functions, routines, subroutines, or operations may be performed by one or more processors of the computer system (e.g., example computer system 500 of FIG. 5) executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other. Therefore, while FIG. 2 and the associated description lists the operations of method 200 in certain order, various implementations of the method may perform at least some of the described operations in parallel and/or in arbitrary selected orders. In one implementation, the method 200 may be performed by one or more of the various components of FIG. 1, such as, sequence engine 122, probability engine 124, etc.

At block 210, the computer system implementing the method may receive a plurality of strings. Each string of the plurality of strings may include a plurality of symbols. For example, the received plurality of strings may be comparable to strings 110 of FIG. 1. Probabilities of occurrence values are to be predicted for each string of the plurality of strings. In some implementations, each string of the plurality of strings may differ from each other string of the plurality of strings by one symbol, which may be referred herein as the "target symbol." The target symbol may be located at the same position of each string.

In some examples, the plurality of strings may correspond to a set of potential strings produced by a translation system for a word to be translated from one language to another. In some examples, the plurality of strings may correspond to a set of candidate strings produced by a text recognition system for a word to be recognized in an image of document. In an example, a word on an image of document may need to be recognized, for which a text recognition system may produce a set of candidate strings consisting of the strings 1) "steamboat," 2) "s1eamboat," 3) "sleamboat," and 4) "sieamboat." The set of candidate strings may be received as a plurality of strings from the text recognition system so that a probability of occurrence of each of the strings of the set of strings may be predicted. The text recognition system may select the string for which the probability is predicted to be the highest amongst the set of candidate strings.

Figure 3:
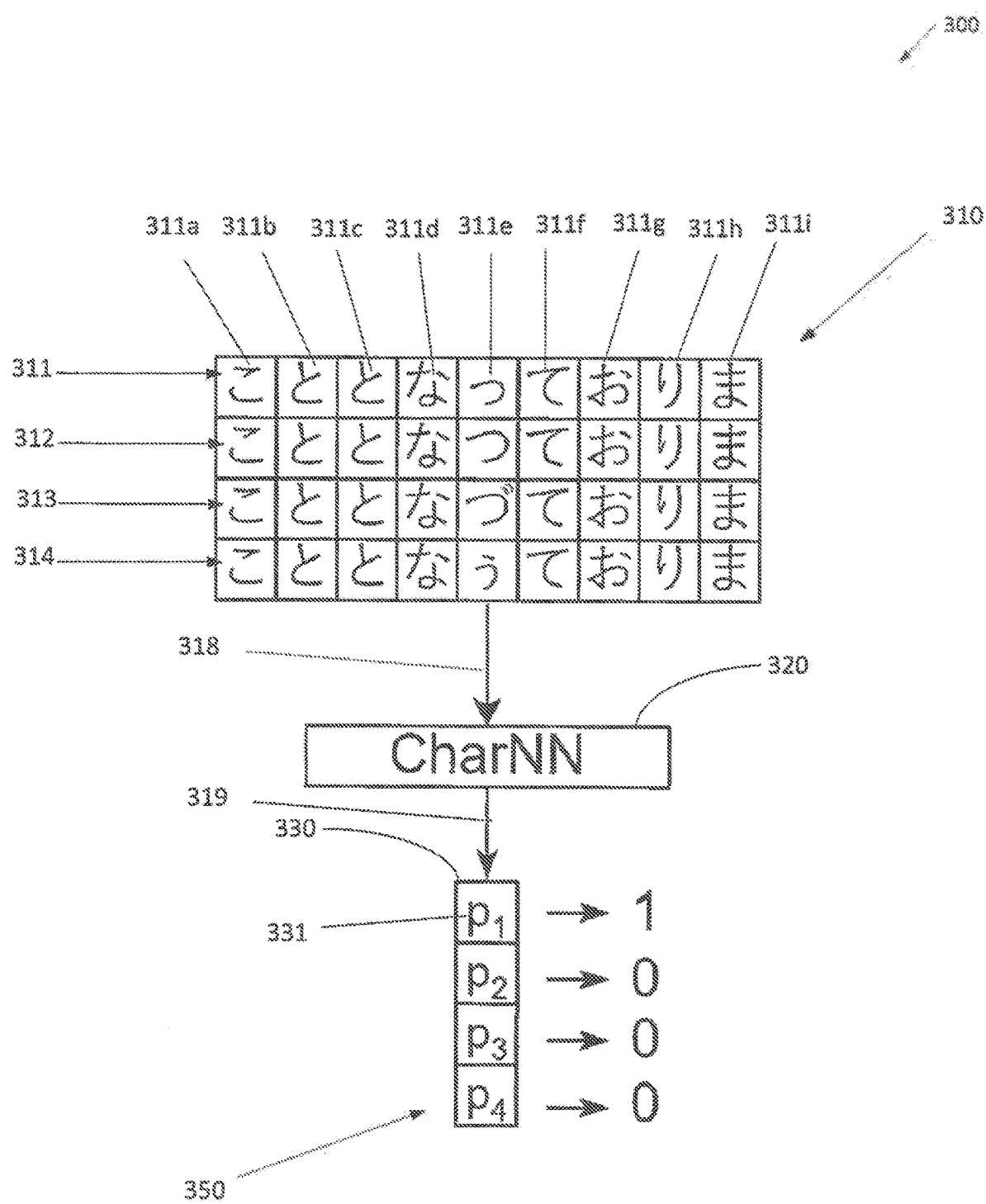
FIG. 3 depicts one illustrative example of receiving a plurality of strings and obtaining a probability of occurrence for each of the plurality of strings, in accordance with one or more aspects of the present disclosure.

For example, FIG. 3 depicts an example of receiving a plurality of strings to obtain a probability of occurrence for each of the plurality of strings, in accordance with one or more aspects of the present disclosure. In the example, the computer system 300 implementing a method to predict probability of occurrences may receive a plurality of strings 310. Plurality of strings 310 may include strings 311, 312, 313, and 314. Each string of the plurality of strings 310 may include a plurality of symbols. For example, string 311 may include plurality of symbols 311a-311i. Each of the plurality of symbols 311a-311i follows one another to form a sequence representing string 311. Each string 311, 312, 313, and 314 may differ from each other by one symbol, which may be referred herein as the "target symbol." The target symbol may be located at the same position of each string. As shown, for the plurality of strings 310, the target symbol is located at the fifth place of the sequence of symbols representing each string. The target symbol 311e of string 312 differs from target symbols of the other strings 312, 313, and 314 located on the same, fifth position of each string. As it is seen, the remaining symbols of each string are same as every other string at the given location of the symbol.

In one example, each string 311, 312, 313 and 314 may represent a candidate string for a word to be recognized. System 300 may receive the strings 310 to predict the probability of occurrence of each string 311-314 to determine the string corresponding to the highest probability. In one example, the string corresponding to the highest probability may be selected as the final recognized word. In another example, some other criteria may be used as it related to the predicted probability values to determine the selected recognized word.

Referring back to FIG. 2, at block 220, the computer system may generate, for each string of the plurality of strings, a first sequence of vectors based at least on a maximum length of word for each symbol in the string. Each vector of the first sequence of vectors may correspond to each symbol in the string. Each vector of the first sequence of vectors may be derived by joining together a first vector comprising the maximum length of word for a given symbol in the string and a second vector comprising a symbol vector for the given symbol in the string. The maximum length of word for each symbol in the string may correspond to length of a longest possible word within the string that starts with the symbol. In some examples, the longest possible word is found in a dictionary. The symbol vector for each symbol in the string may be based on one or more of: a symbol embedding; a unified vector for symbols of an alphabet that is different from the alphabet used in the string; a vector for frequently occurring punctuation marks; a vector for rare punctuation marks; or a vector for numerals.

Figure 4:
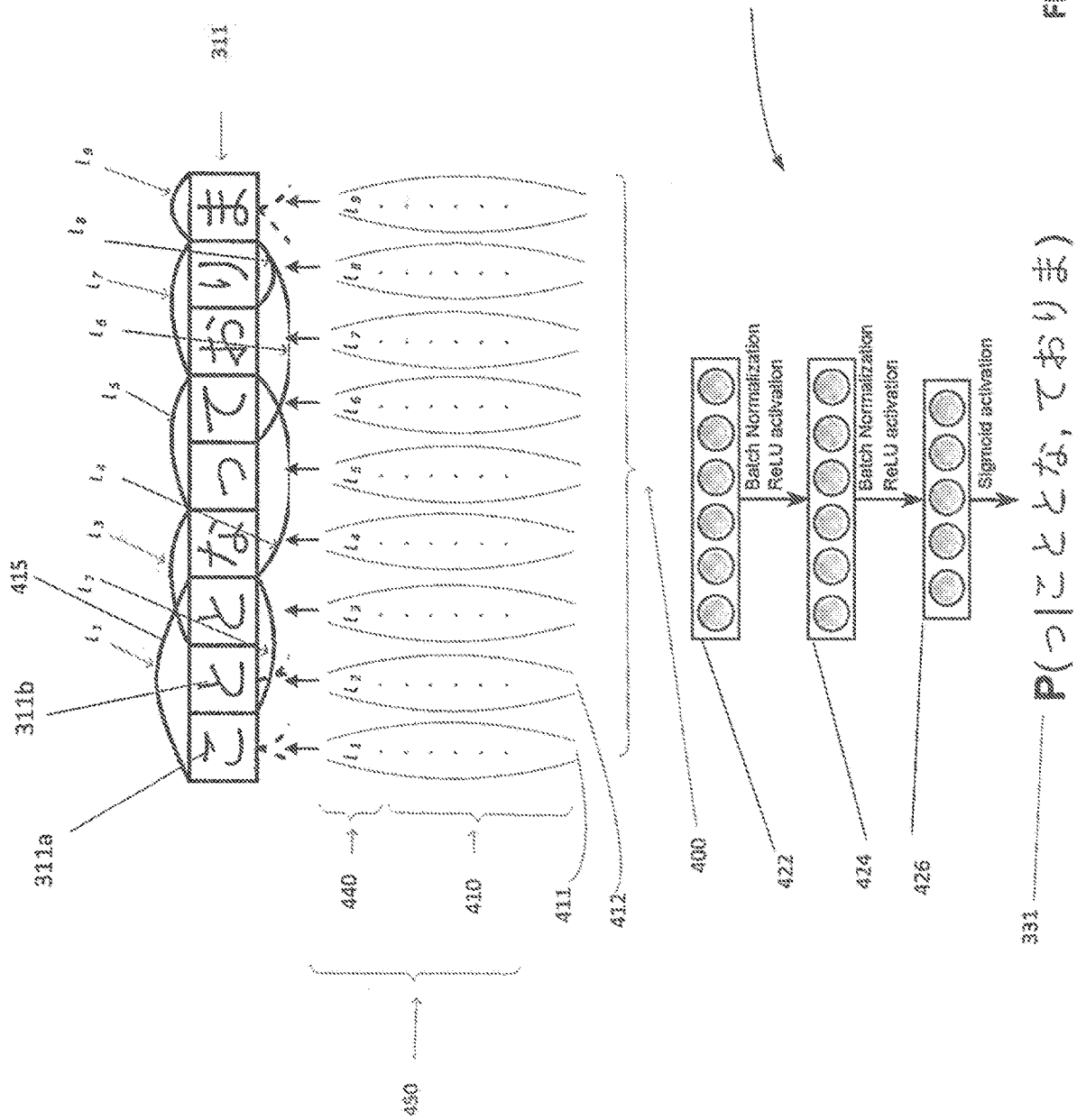
FIG. 4 depicts one illustrative example of generating a sequence of vectors to provide to a machine learning unit to obtain a probability of occurrence, in accordance with one or more aspects of the present disclosure.

For example, FIG. 4 depicts an example of generating a sequence of vectors 400 to provide to a machine learning unit 320 to obtain a probability of occurrence 331. The example depicts generating the sequence of vectors 400 for string 311 of plurality of strings 310 depicted in FIG. 3. Each vector of the sequence of vectors 400 may correspond to each symbol in the string 311. For example, vector 411 may correspond to symbol 311a of string 311 and vector 412 may correspond to symbol 311b of string 311. Each vector (e.g., vector 411, vector 412, etc.) of the sequence of vectors 400 may be derived by joining together a first vector 440 and a second vector 410 for each symbol (e.g., symbol 311a, symbol 311b, etc.) of the string 311, respectively.

The first vector 440 may comprise the maximum length of word for a given symbol in the string. For example, first vector 440 of vector 411 may consist of one element for the maximum value for the symbol 311a. The maximum length of a word for each symbol may correspond to length of a longest possible word within the string that starts with the symbol. In some examples, the longest possible word is found in a dictionary. For example, for the symbol 311a, the longest possible word within string 311 found in a dictionary that starts with the symbol 311a consists of the three symbols in range 415. Thus, for symbol 311a, the length of the longest possible word within the string is three, which is represented by "$l_1$." Accordingly, the value of the element of first vector 440 corresponding to the first symbol 311a of string 311 is "$l_1$." Similarly, the longest possible word within string 311 starting with the symbol 311b spans for two symbols and is represented by "$l_2$." Accordingly the maximum length of the word for the symbol 311b is assigned as "$l_2$." The maximum lengths (e.g., $l_1$-$l_9$) of each symbol may be determined using the same technique and be entered into first vector 440 corresponding to each of the symbols of the string 311.

In the example discussed above with regards to the strings received from a text recognition system, the plurality of strings consisted of the strings 1) "steamboat," 2) "s1eamboat," 3) "sleamboat," and 4) "sieamboat." For the string "steamboat," "steam" is a word and "steamboat" is another word within the string that starts with the symbol "s." The maximum length of a word for the symbol "s" is the length of the longest possible word "steamboat" within the string that is found in a dictionary. Thus, the length corresponding to symbol "s" is nine. In another example, for the symbol "t," "tea" is a dictionary word and "team" is another dictionary word, with "team" being the longest possible word appearing within the string. Thus, the maximum length corresponding to the symbol "t" is four. A vector containing the value of maximum length may be derived corresponding to each symbol of the string. If no symbol sequences starting with the symbol were found in the dictionary, then the maximum length could be zero.

The second vector 410 for a given symbol may comprise a symbol vector for the given symbol. In an implementation, the symbol vector for the given symbol may be formed based on symbol embeddings. Using symbol embeddings (or word embeddings), a symbol or a word may be represented via vectors. Symbol embeddings are used to represent symbols in an alphabet by mapping the symbols to vectors of real numbers. Using symbol embeddings, an entire alphabet can be formalized into a look-up table. The lookup table may be a hash table with unique vector for every symbol of the alphabet. Additionally, the look-up table may contain or be based on additional vectors other than the symbol vectors. In some examples, the additional vectors may include a single or unified vector for symbols of a different alphabet than the alphabet of the string. The look-up table may also include a vector for all frequently occurring punctuation marks, a vector for all rare punctuation marks, vector for numerals, etc. The vectors in the look-up table may be previously trained embeddings. In order to generate the symbol vector for a given symbol of a string, the look-up table may be used to identify the corresponding values for the given symbol of the string. In some embodiments, the symbol vector may have a dimension of 24. That is, the symbol vector for the given symbol may consist of 24 elements in the symbol vector.

Each vector of the sequence of vectors 400 corresponding to each symbol may be derived by concatenating the first vector 440 and second vector 410 together into one vector 450. For example, vector 411 is generated for symbol 311*a* of string 311 by joining together the first vector 440 for symbol 311*a* and second vector 410 for symbol 311*a*. Each of the combined vectors for each symbol is then placed together to form the sequence of vectors 400. In the example of FIG. 4, the sequence of vectors 400 consists of nine vectors, one vector each for each symbol 311*a*-311*i* of string 311. Each of the nine vectors is derived by combining a first vector 440 of maximum length and a second vector 410 of symbol vector for the corresponding symbol.

Referring back to FIG. 2, at block 230, the computer system may provide to a machine learning unit the first sequence of vectors for each string of the plurality of strings. For example, FIG. 3 shows arrow 318 entering as an input to machine learning unit 320. As shown in further details in FIG. 4, the first sequence of vectors 400 is provided to the machine learning unit 320 for the string 311. The machine learning unit may include a first fully connected layer 422 and a second fully connected layer 424 to apply matrix transformation on the first sequence of vectors 400 for string 311. A batch normalization function and a rectifier linear unit (ReLU) activation function are applied on a first output of the first fully connected layer and on a second output of the second fully connected layer. In an example, the dimension of the first and/or the second layer may be 256. A third fully connected layer to be used as an output layer. A sigmoid activation function may be applied on a third output of the third fully connected layer.

Referring back to FIG. 2, at block 240, the computer system may obtain from the machine learning unit a probability of occurrence of each string of the plurality of strings. The probability of occurrence for a given string having a value nearest to 'one' relative to the probability of occurrence values of the remaining strings indicates that the given string has the highest probability of occurrence. The probability value can be identified by real numbers, generally ranging from zero to 1, but the values may consist of intermediate values such as 0.1, 0.2, or 0.9, etc. FIG. 3 depicts arrow 319 coming out of machine learning unit 320 as an output. The machine learning unit may provide as an output a probability of occurrence of each string of the plurality of strings. The probability value may be expressed using a vector, where each vector component corresponds to one string. For example, a vector 350 containing four probability values has been produced as an output of machine learning unit 320. The value of each component of the vector 350 may represent the probability of occurrence value corresponding to each of the strings 310. The value of the component of the vector that is closest to the value 'one' compared to the values of the other components corresponds to the string having the highest probability of occurrence. For example, the first component of vector 350 contains the highest probability value 331 with a value of "1" amongst all other values of "0." Thus, in an example if the plurality of strings reflects different possibilities of a word to be recognized, the string that produces the highest probability value may be the string that represents the most likely possibility of word recognition. FIG. 4 depicts obtaining from the machine learning unit 320 a probability of occurrence 331 for string 311. The probability 331 is provided for the target symbol 311*e*, given the context prior to the target symbol and the context following the target symbol.

Figure 5:
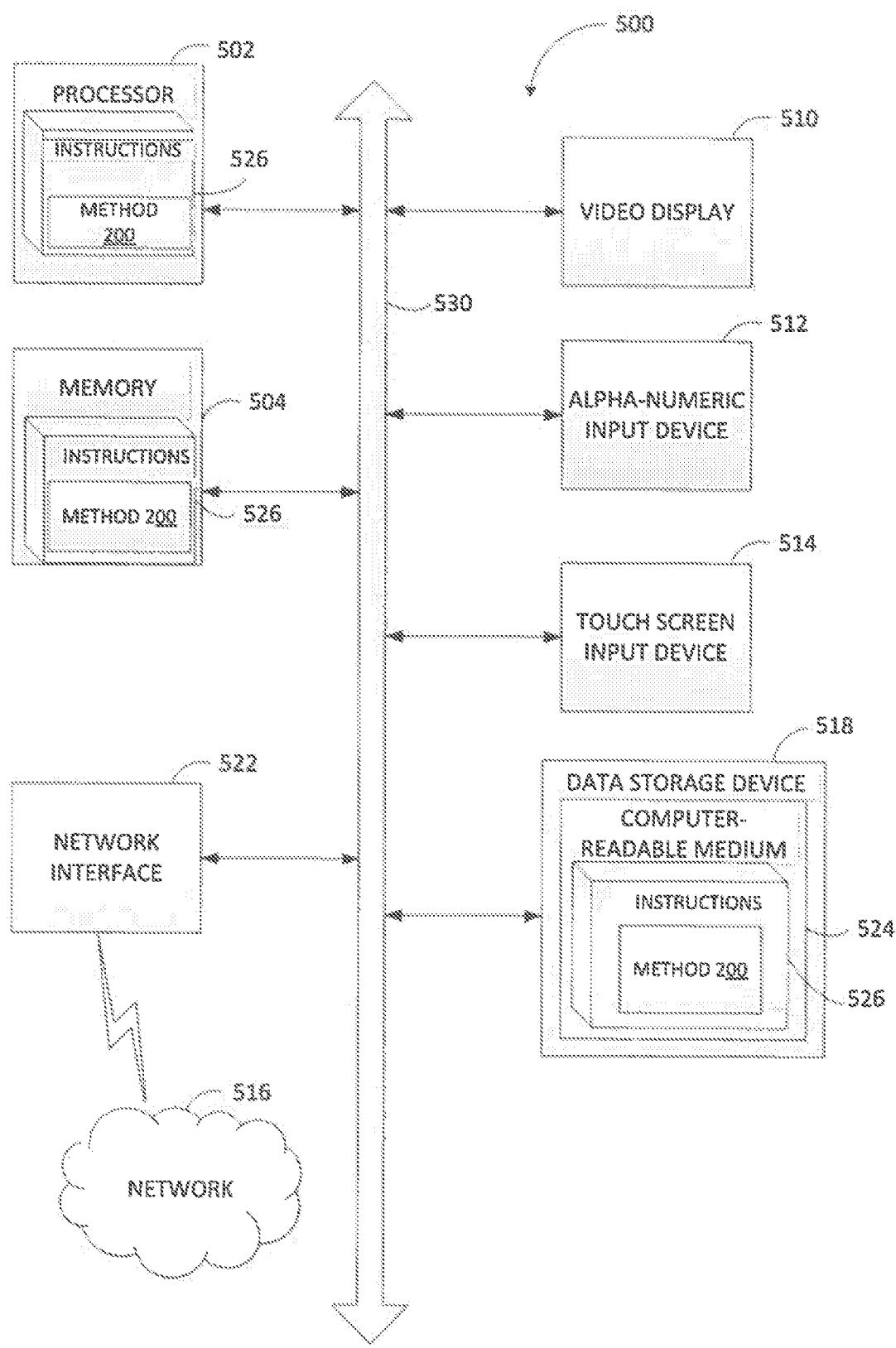
FIG. 5 depicts an example computer system which can perform any one or more of the methods described herein, in accordance with one or more aspects of the present disclosure.

FIG. 5 depicts an example computer system 500 which can perform any one or more of the methods described herein, in accordance with one or more aspects of the present disclosure. In one example, computer system 500 may correspond to a computing device capable of performing method 200 of FIG. 2. The computer system 500 may be connected (e.g., networked) to other computer systems in a LAN, an intranet, an extranet, or the Internet. The computer system 500 may operate in the capacity of a server in a client-server network environment. The computer system 500 may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker). In one illustrative example, the video display unit 510, the alphanumeric input device 512, and the cursor control device 514 may be combined into a single component or device (e.g., an LCD touch screen).

The data storage device 518 may include a computer-readable medium 528 on which the instructions 522 embodying any one or more of the methodologies or functions described herein is stored. The instructions 522 may also reside, completely or at least partially, within the main memory 504 and/or within the processing device 502 during execution thereof by the computer system 500, the main memory 504 and the processing device 502 also constituting computer-readable media. The instructions 522 may further be transmitted or received over a network via the network interface device 508.

While the computer-readable storage medium 528 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   generating, by a processing device, a sequence of vectors based at least on a maximum length of word for each symbol of a plurality of symbols in a string, wherein the maximum length corresponds to length of a longest possible word within the string that starts with the symbol, the longest possible word comprising one or more of a word: 1) with a commonplace meaning, or 2) found in a dictionary;
   providing the sequence of vectors for the string to a machine learning unit; and obtaining a probability of occurrence of the string from the machine learning unit.

2. The method of claim 1, wherein each vector of the sequence of vectors corresponds to a symbol of the plurality of symbols in the string.

3. The method of claim 2, wherein each vector of the sequence of vectors is derived by joining together a first vector comprising the maximum length of word for a given symbol in the string and a second vector comprising a symbol vector for the given symbol in the string.

4. The method of claim 3, wherein the symbol vector for each symbol in the string is based on one or more of:
 a symbol embedding;
 a unified vector for symbols of an alphabet that is different from the alphabet used in the string;
 a vector for frequently occurring punctuation marks;
 a vector for rare punctuation marks; or
 a vector for numerals.

5. The method of claim 1, further comprising:
 receiving a plurality of strings comprising the string, wherein each string of the plurality of strings comprises a plurality of symbols, and wherein generating a sequence of vectors is performed for each string of the plurality of strings.

6. The method of claim 5, wherein each string of the plurality of strings differs from each other string of the plurality of strings by one symbol, the one symbol being located on a same position of each string.

7. The method of claim 5, wherein the probability of occurrence for a given string having a value nearest to 'one' relative to probability of occurrence values of the remaining strings indicates that the given string has the highest probability of occurrence.

8. The method of claim 1, wherein the machine learning unit comprises:
 a first fully connected layer and a second fully connected layer to apply matrix transformation on the sequence of vectors for each string; and
 a third fully connected layer to be used as an output layer.

9. The method of claim 8, wherein a batch normalization function and a rectifier linear unit activation function are applied on a first output of the first fully connected layer and on a second output of the second fully connected layer, and wherein a sigmoid activation function is applied on a third output of the third fully connected layer.

10. A system comprising:
 a memory device storing instructions; and
 a processing device coupled to the memory device, the processing device to execute the instructions to:
 generate a sequence of vectors based at least on a maximum length of word for each symbol of a plurality of symbols in a string, wherein the maximum length corresponds to length of a longest possible word within the string that starts with the symbol, the longest possible word comprising one or more of a word: 1) with a commonplace meaning, or 2) found in a dictionary;
 provide the sequence of vectors for the string to a machine learning unit; and
 obtain a probability of occurrence of the string from the machine learning unit.

11. The system of claim 10, wherein each vector of the sequence of vectors corresponds to a symbol of the plurality of symbols in the string.

12. The system of claim 11, wherein each vector of the sequence of vectors is derived by joining together a first vector comprising the maximum length of word for a given symbol in the string and a second vector comprising a symbol vector for the given symbol in the string.

13. The system of claim 12, wherein the symbol vector for each symbol in the string is based on one or more of:
 a symbol embedding;
 a unified vector for symbols of an alphabet that is different from the alphabet used in the string;
 a vector for frequently occurring punctuation marks;
 a vector for rare punctuation marks; or
 a vector for numerals.

14. The system of claim 10, wherein the processing device is further to:
 receive a plurality of strings comprising the string, wherein each string of the plurality of strings comprises a plurality of symbols, and wherein generating a sequence of vectors is performed for each string of the plurality of strings.

15. The system of claim 14, wherein each string of the plurality of strings differs from each other string of the plurality of strings by one symbol, the one symbol being located on a same position of each string.

16. The system of claim 14, wherein the probability of occurrence for a given string having a value nearest to 'one' relative to probability of occurrence values of the remaining strings indicates that the given string has the highest probability of occurrence.

17. The system of claim 10, wherein the machine learning unit comprises:
 a first fully connected layer and a second fully connected layer to apply matrix transformation on the sequence of vectors for each string; and
 a third fully connected layer to be used as an output layer.

18. The system of claim 17, wherein a batch normalization function and a rectifier linear unit activation function are applied on a first output of the first fully connected layer and on a second output of the second fully connected layer, and wherein a sigmoid activation function is applied on a third output of the third fully connected layer.

19. A non-transitory computer-readable storage medium storing instructions that, when executed by a processing device, cause the processing device to:
 generate a sequence of vectors based at least on a maximum length of word for each symbol of a plurality of symbols in a string, wherein the maximum length corresponds to length of a longest possible word within the string that starts with the symbol, the longest possible word comprising one or more of a word: 1) with a commonplace meaning, or 2) found in a dictionary;
 provide the sequence of vectors for the string to a machine learning unit; and
 obtain a probability of occurrence of the string from the machine learning unit.

20. The non-transitory computer-readable storage medium of claim 19, wherein the machine learning unit comprises:
 a first fully connected layer and a second fully connected layer to apply matrix transformation on the sequence of vectors for each string; and
 a third fully connected layer to be used as an output layer.

\* \* \* \* \*